United States Patent [19]
Nozawa

[11] Patent Number: 5,963,678
[45] Date of Patent: *Oct. 5, 1999

[54] IMAGE SIGNAL PROCESSING APPARATUS AND METHOD

[75] Inventor: Shingo Nozawa, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/772,920

[22] Filed: Dec. 24, 1996

[30] Foreign Application Priority Data

Dec. 28, 1995 [JP] Japan ................................ 7-343891

[51] Int. Cl.$^6$ .............................. G06K 9/32; G06K 9/36; G06K 9/46
[52] U.S. Cl. ........................... 382/299; 382/232; 382/233
[58] Field of Search ................................... 382/256–258, 382/299, 300, 232, 233, 235

[56] References Cited

PUBLICATIONS

Ratael C. Gouzalez and Richard E. Woods "Digital Image Processing," Addison–Wesley Publishing Company, 1992, pp. 518–524.

*Primary Examiner*—Jose L. Couso
*Assistant Examiner*—Dmitry A. Novik
*Attorney, Agent, or Firm*—Fitzpatrick, Cella, Harper & Scinto

[57] ABSTRACT

An image signal having h×v pixel signals in the horizontal and vertical directions, respectively, is input to an image signal processor and converted into an image signal having m×n pixel signals in the horizontal and vertical directions, respectively. The converted image signal having m×n pixel signals is then converted into the image signal having h×v pixel signals and is then subjected to compression encoding. The compresed image signal is decoded and converted into the image signal having m×n pixel signals by thinning the pixel signals of the decoded image signal.

23 Claims, 5 Drawing Sheets

IMAGE SIGNAL PROCESSING APPARATUS AND METHOD

BACKGROUND OF THE INVENTION

1. Field of the Invention

This invention relates to an image signal processing apparatus and method. More specifically, the invention relates to the processing and encoding/decoding of an image signal.

2. Description of the Related Art

Recently, as a result of progress in digital signal processing techniques, image apparatuses have been developed in which a large amount of digital information representing moving images, still images and the like is subjected to high-efficiency encoding, and the obtained signal is recorded on a small-size recording medium or transmitted to a communication medium. Digital information recorded on or transmitted to various kinds of media is utilized for various kinds of uses not only by reproducing the information in the form of an image but also by receiving the information in a computer and processing the received information.

Conventional image apparatuses for performing digital signal processing of moving images or still images intend to improve the resolution of the images by using vertically long pixels. For example, in many digital image apparatuses, an image having an aspect ratio of 3:4 is formed by arranging 480 pixels in the vertical direction and 720 pixels in the horizontal direction, each pixel having an aspect ratio of 9:8.

On the other hand, in conventional image processing using a computer, square pixels having an aspect ratio of 1:1 are generally used, and in most cases, an image having an aspect ratio of 3:4 is formed by arranging 480 pixels in the vertical direction and 640 pixels in the horizontal direction.

As described above, the aspect ratio of pixels constituting an image differs between image apparatuses and computers. Hence, when exchanging data between an image apparatus and a computer, it is, in most cases, necessary to perform processing for correcting the aspect ratio of an image.

FIG. 1 is a block diagram illustrating an example of the configuration of a conventional high-efficiency encoding/decoding apparatus for correcting the aspect ratio of an image by compressing/expanding an image signal.

In FIG. 1, an image signal representing an image comprising 480 pixels in the vertical direction and 720 pixels in the horizontal direction, each pixel having an aspect ratio of 9:8, is input to an input terminal 101, subjected to compression encoding by a compression unit 102 and is recorded on a recording medium 103.

A signal reproduced from the recording medium 103 is subjected to expansion encoding by an expansion unit 104, and is then subjected to band limitation by a low-pass filter (LPF) 105. Components representing pixels in the horizontal direction in the signal are thinned by a thinning unit 106. By this thinning processing, an image signal representing an image having an aspect ratio of 1:1 and comprising 480 pixels in the vertical direction and 640 pixels in the horizontal direction is output from an output terminal 107.

In the above-described conventional high-efficiency encoding/decoding apparatus, the picture quality is significantly degraded during compression/expansion. Even though the number of pixels is changed by band restriction and thinning, a high-quality image cannot be supplied to a computer. In order to solve such problems, a method of using different high-efficiency encoding apparatuses depending on the aspect ratio of pixels is considered. This approach, however, has the problem that various kinds of formats are produced on the medium, thereby degrading the efficiency of development.

SUMMARY OF THE INVENTION

The present invention has been made in consideration of the above-described problems.

It is an object of the present invention to provide an image signal processing apparatus and method which responds to a plurality of kinds of aspect ratios of pixels while using a common medium format, and in which an image suffers minimal degradation during encoding/decoding.

According to one aspect, the present invention which achieves the above-described object relates to an image signal processor which has input thereto an image signal having h×v pixel signals in the horizontal and vertical directions, respectively, which are then converted by a first converter into an image signal having m×n pixel signals in the horizontal and vertical directions, respectively, by thinning the pixel signals of the input image signal. A second converter converts the image signal having m×n pixel signals into the image signal having h×v pixel signals, and an encoder performs compression encoding of the converted having h×v pixel signals.

According to another aspect, the present invention which achieves the above-described object relates to an image signal processor which has input thereto an image signal having h×v pixel signals in the horizontal and vertical directions, respectively, which have been subjected to compression encoding. A decoder decodes the compressed h×v pixel signals and a converter converts the decoded image signal into an image signal having m×n pixel signals in the horizontal and vertical directions, respectively, by thinning the decoded image signal.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

A description is provided below of a preferred embodiment of the present invention.

Figure 1:
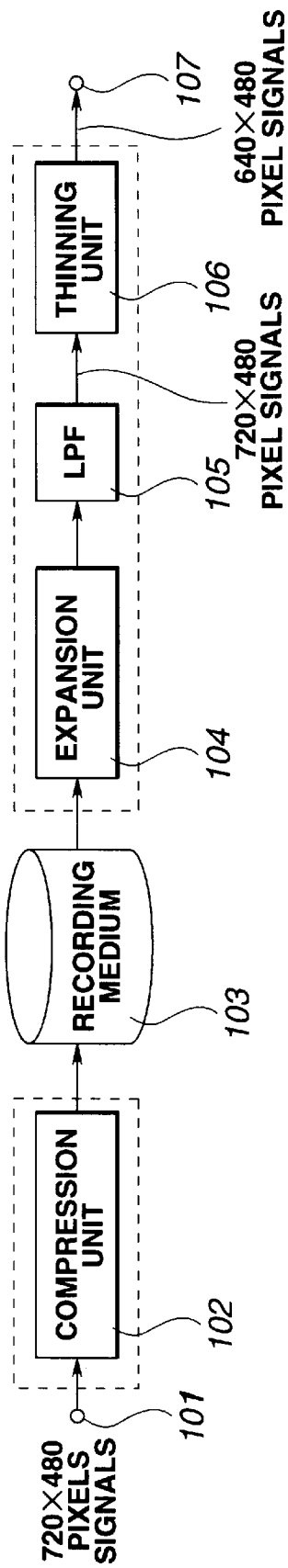
FIG. 1 is a block diagram illustrating the configuration of a conventional high-efficiency encoding/decoding apparatus.
Figure 2:
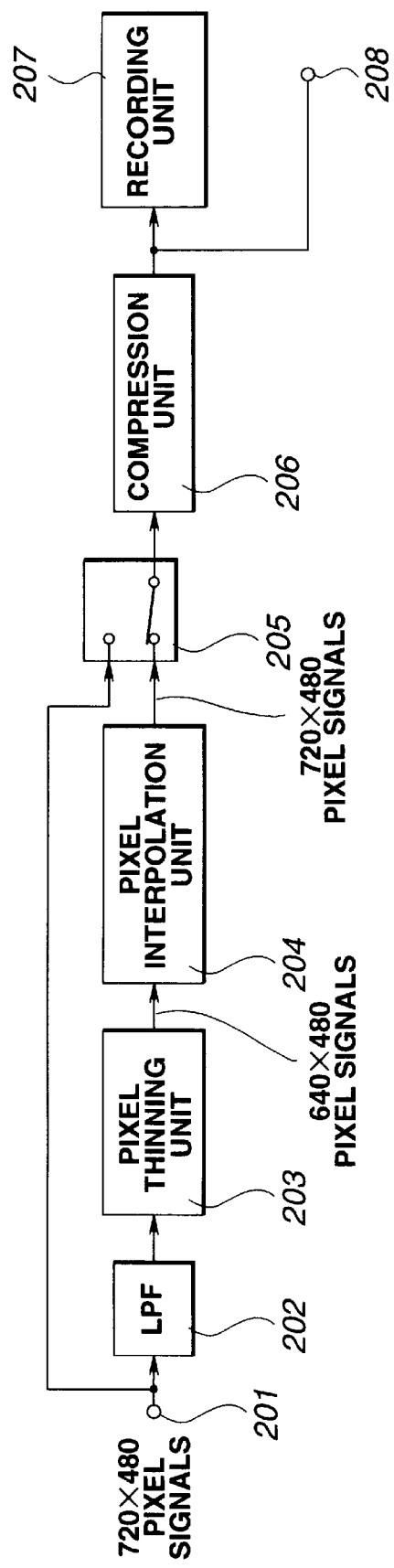
FIG. 2 is a block diagram illustrating the configuration of a high-efficiency encoding apparatus according to an embodiment of the present invention.

FIG. 2 is a block diagram illustrating the configuration of a high-efficiency encoding apparatus according to the embodiment.

In the present embodiment, it is assumed that an image signal representing an image having an aspect ratio of 9:8 in which 480 pixels and 720 pixels are arranged in the vertical direction and in the horizontal direction, respectively, is input to an input terminal 201 with a frequency of 13.5 MHz (megahertz).

The image signal of 480 pixels and 720 pixels arranged in the vertical and horizontal directions, respectively, input to the input terminal 201, are applied to a LPF 202 and a first terminal of switch 205.

The frequency band of the image signal input to the input terminal 201 is limited by the LPF 202. The LPF 202 of the present embodiment passes only components whose frequencies are equal to or less than 12 MHz.

The image signal processed by the LPF 202 is supplied to a pixel thinning unit 203. The pixel thinning unit 203 thins one pixel signal per nine pixel signals arranged in the horizontal direction (on the picture surface), and supplies a pixel interpolation unit 204 with the resultant signal. According to the processing of the pixel thinning unit 203, the image signal becomes a signal representing an image comprising 480 pixels in the vertical direction and 640 pixels in the horizontal direction. Accordingly, at this time, a signal suitable for processing in a computer and the like is obtained.

The pixel interpolation unit 204 interpolates one pixel signal per eight pixel signals arranged in the horizontal direction for the image signal supplied from the pixel thinning unit 203, and supplies a switch 205 with the resultant signal. For example, the value of the preceding pixel may be used as an interpolation signal.

According to the processing of the pixel interpolation unit 204, an image signal representing an image comprising 480 pixels in the vertical direction and 720 pixels in the horizontal direction, which is the same as the input image signal, is obtained. In short, unit 204 outputs to a second terminal of switch 205 an image signal of 480 pixels and 720pixels arranged in the horizontal and vertical directions. Since the signals applied to the first and second terminal of switch 205 are both 480 pixels by 720 pixels. According to this conversion, the same medium format as that for the input signal can be utilized without being modified.

The switch 205 selects one of the image signal output from the pixel interpolation unit 204 and the image signal supplied to the LPF 202 in accordance with the use of high-efficiency encoding by the apparatus, and supplies a compression unit 206 with the selected signal. For example, in a use which requires an image signal having an aspect ratio of pixels of 1:1 for a computer and the like, the switch 205 selects the image signal output from the pixel interpolation unit 204, and in a use which requires an image signal having an aspect ratio of pixels of 9:8 suitable for many image apparatuses, the image signal supplied to the LPF 202 is selected. The selection of the image signal by the switch 205 may be performed by manual switching by the user, or by automatic switching in accordance with the destination of the image signal.

The compression unit 206 performs compression encoding of the image signal supplied via the switch 205 according to a compression encoding method (to be described later), and supplies a recording unit 207 and/or an output terminal 208 with the resultant signal.

The compression processing of the compression unit 206 is described below.

Figure 3:
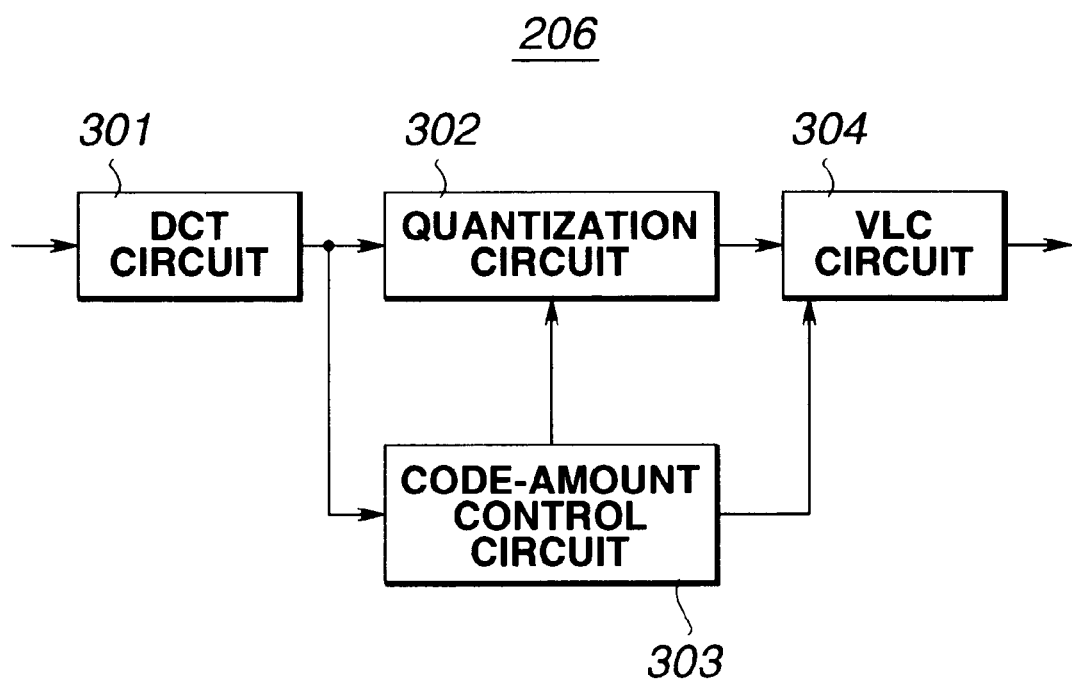
FIG. 3 is a block diagram illustrating the configuration of the compression unit 206 shown in FIG. 2.

FIG. 3 is a block diagram illustrating the configuration of the compression unit 206.

In FIG. 3, a discrete cosine transform (DCT) circuit 301 performs an orthogonal transform of the supplied image signal. The image signal processed by the DCT circuit 301 is quantized by a quantization circuit 302. The quantization step used in the quantization circuit 302 is controlled by a code-amount control circuit 303. The code-amount control circuit 303 controls the quantization step so that the amount of codes generated when an image signal of a predetermined unit is subjected to compression encoding processing equals a predetermined amount of codes.

The image signal quantized by the quantization circuit 302 is subjected to variable-length coding by a variable-length-coding (VLC) circuit 304. Quantization-step information has been input from the code-amount control circuit 303 to the VLC circuit 304, which multiplexes the encoded image signal with the quantization-step information and outputs the resultant signal.

A description is provided below of a high-efficiency decoding apparatus according to the embodiment.

Figure 4:
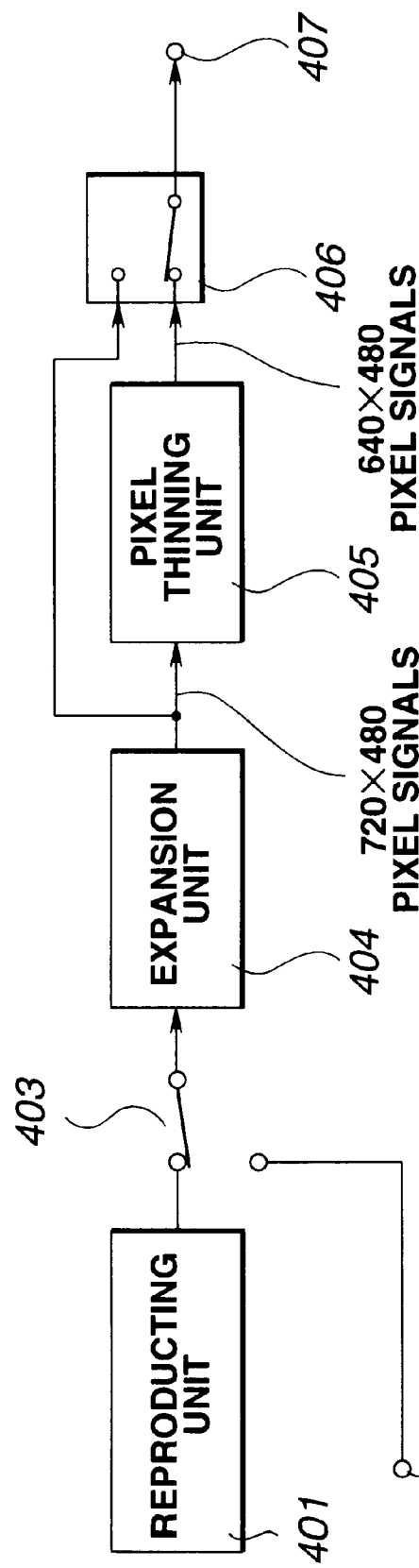
FIG. 4 is a block diagram illustrating the configuration of a high-efficiency decoding unit according to the embodiment.

FIG. 4 is a block diagram illustrating an example of the configuration of the high-efficiency decoding apparatus of the embodiment.

In FIG. 4, a reproducing unit 401 reproduces the image signal recorded on the recording medium by the recording unit 207 shown in FIG. 2. An input terminal 402 is connected to the output terminal 208 shown in FIG. 2, and receives the image signal subjected to compression encoding.

An expansion unit 404 expands the image signal input via a switch 403. The image signal subjected to the expansion processing comprises pixel signals representing 480 pixels in the vertical direction and 720 pixels in the horizontal direction. The image signal expanded by the expansion unit 404 is output to a switch 406 and to a pixel thinning unit 405.

The pixel thinning unit 405 thins one pixel signal per nine pixel signals arranged in the horizontal direction in the image signal supplied from the expansion unit 404, and supplies the switch 406 with the resultant signal. The switch 406 selects one of the image signal output from the pixel thinning unit 405 and the image signal output from the expansion unit 404 in accordance with the destination of the image signal, and outputs the selected signal from an output terminal 407.

For example, in a use which requires an image signal having an aspect ratio of pixels of 1:1 for a computer and the like, the switch 406 selects the image signal output from the pixel thinning unit 405, and in a use which requires an image signal having an aspect ratio of pixels of 9:8 which is useful for many image apparatuses, the switch 406 selects the image signal output from the expansion unit 404.

Although in the present embodiment, the switch 406 selects one of the output signal from the expansion unit 404 and the output signal from the pixel thinning unit 405, the two signals may be output in parallel by omitting the switch 406. According to this configuration, the signals can be simultaneously output to various kinds of peripheral apparatuses.

A description is provided below for the expansion processing of the expansion unit 404.

Figure 5:
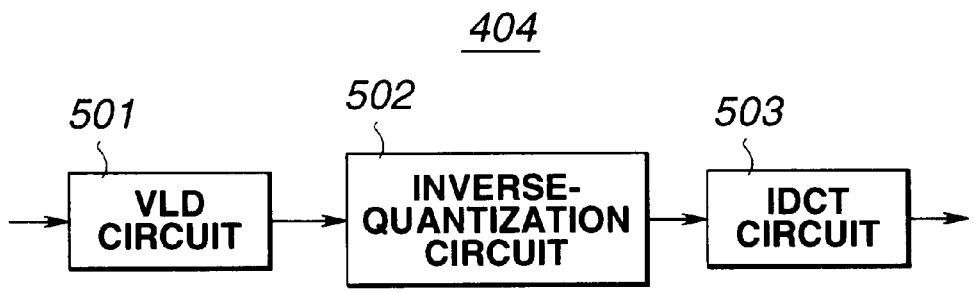
FIG. 5 is a block diagram illustrating the configuration of the expansion unit 404 shown in FIG. 4.

FIG. 5 is a block diagram illustrating the configuratiorn of the expansion unit 404.

In FIG. 5, a variable-length-decoding (VLD) circuit 501 performs variable-length decoding of the supplied image signal, and supplies an inverse-quantization circuit 502 with the resultant signal. The inverse-quantization circuit 502 performs inverse quantization of the decoded image signal, and supplies an inverse-discrete-cosine-transform (IDCT) circuit 503 with the resultant signal.

The inverse-quantization circuit 502 performs inverse quantization of the image signal based on the quantization-step information transmitted together with the image signal. The IDCT circuit 503 performs an inverse orthogonal transformation of the image signal subjected to inverse quantization by the inverse-quantization circuit 502, and outputs the resultant signal.

The high-efficiency encoding apparatus must use a compression method which confines the amount of data within a predetermined range due to a limitation in the capacity of the recording medium or the transmission medium. Hence, when a complicated image is supplied, the picture quality is degraded in the stage of compression/expansion processing.

As described above, in the conventional high-efficiency encoding/decoding apparatus, since processing by changing the aspect ratio of the image is performed for an image degraded by compression/expansion processing, the image is further degraded.

On the other hand, in the high-efficiency encoding apparatus of the embodiment, by changing the aspect ratio of the image before compression processing and thereby reducing the amount of data in advance, degradation by compression/expansion processing is reduced. Furthermore, in this high-efficiency encoding apparatus, since a redundant signal is inserted in an image signal subjected to a change in the aspect ratio of the image to obtain a signal in the same form as the input signal, the same compression/expansion unit and medium format as those for the input signal can be utilized. In addition, in the high-efficiency decoding apparatus of the embodiment, the aspect ratio of an image can easily be changed to a target value by the pixel thinning unit 405, and the picture quality is minimally degraded during this change.

Figure 6:
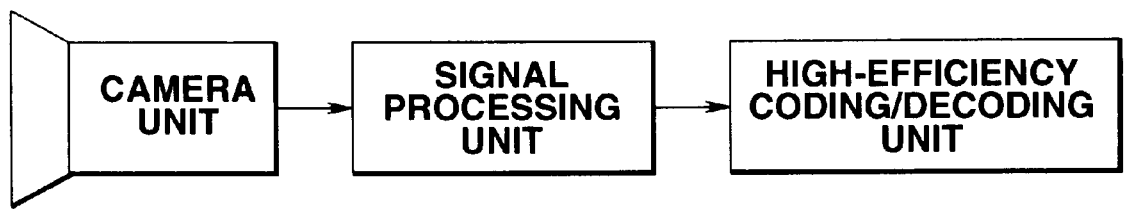
FIG. 6 is a block diagram illustrating the configuration of a digital camcorder including the apparatuses shown in FIGS. 2 and 4.

By using the high-efficiency encoding apparatus shown in FIG. 2 and the high-efficiency decoding apparatus shown in FIG. 4 in a camcorder as shown in FIG. 6, a digital camcorder which can be connected to various kinds of apparatuses is obtained.

A signal processing unit shown in FIG. 6 performs processing by converting an image signal representing an image photographed by a camera unit into an image signal representing an image in which 480 pixels and 720 pixels are arranged in the vertical direction and in the horizontal direction, respectively, each pixel having an aspect ratio of 9:8, with a frequency of 13.5 MHz. A high-efficiency encoding/decoding unit shown in FIG. 6 is configured by the high-efficiency encoding device shown in FIG. 2 and the high-efficiency decoding device shown in FIG. 4.

The individual components designated by blocks in the drawings are all well known in the image signal processing apparatus and method arts and their specific construction and operation are not critical to the operation or the best mode for carrying out the invention.

While the present invention has been described with respect to what are presently considered to be the preferred embodiments, it is to be understood that the invention is not limited to the disclosed embodiments. For example, the number of pixels of input image signal and the number of pixels of converted image signal are not limited to the number of pixels described in the embodiments. In other words, to the foregoing description of embodiments has been given for illustrative purposes only and is not to be construed as imposing any limitation in any respect. On the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image signal processing apparatus, comprising:
    input means for inputting an image signal comprising h×v pixel signals in a horizontal direction and in a vertical direction;
    first conversion means for converting the image signal input by said input means into an image signal comprising m×n pixel signals in the horizontal direction and the vertical direction by thinning the pixel signals of the input image signal, wherein said first conversion means further comprises band limitation means for limiting a frequency band of the image signal input by said input means;
    second conversion means for converting the image signal comprising the m×n pixel signals obtained by said first conversion means into the image signal comprising the h×v pixel signals; and
    encoding means for performing compression encoding of the image signal converted by said second conversion means.

2. An apparatus according to claim 1, further comprising:
    selection means for selectively supplying said encoding means with one of the image signal output from said second conversion means and the image signal supplied to said first conversion means.

3. An apparatus according to claim 1, wherein the value of h equals 720, and the value of v equals 480.

4. An apparatus according to claim 3, wherein the value of m equals 640, and the value of n equals 480.

5. An apparatus according to claim 1, wherein the image signal input by said input means has a frequency of 13.5 MHz, and wherein said band limitation means comprises a low-pass filter for passing signals whose frequencies are equal to or less than 12 MHz.

6. An apparatus according to claim 3, wherein said first conversion means performs processing of thinning one pixel signal per nine pixel signals arranged in the horizontal direction.

7. An apparatus according to claim 6, wherein said second conversion means performs processing of interpolating one pixel signal per eight pixel signals arranged in the horizontal direction.

8. An image signal processing apparatus, comprising:
    input means for inputting an image signal comprising h×v pixel signals in a horizontal direction and in a vertical direction, subjected to compression encoding;
    decoding means for decoding the image signal input by said input means;
    conversion means for converting the image signal decoded by said decoding means into an image signal comprising m×n pixel signals in the horizontal direction and the vertical direction by thinning the pixel signals of the decoded image signal; and
    output means for selectively outputting one of the image signal output from said conversion means and the image signal output from said decoding means.

9. An apparatus according to claim 8, wherein the value of h equals 720, and the value of v equals 480.

10. An apparatus according to claim 9, wherein the value of m equals 640, and the value of n equals 480.

11. An image signal processing method, comprising the steps of:

inputting an image signal comprising h×v pixel signals in a horizontal direction and in a vertical direction;

converting the image signal input in said input step into an image signal comprising m×n pixel signals in the horizontal direction and the vertical direction by thinning the pixel signals of the input image signal, wherein said first conversion step includes band limitation step for limiting a frequency band of the image signal input in said input step;

converting the image signal comprising the m×n pixel signals obtained in said m×n pixel signals conversion step into the image signal comprising the h×v pixel signals; and performing compression encoding of the image signal converted in said h×v pixel signals conversion step.

12. An image signal processing method, comprising the steps of:

inputting an image signal comprising h×v pixel signals in a horizontal direction and in a vertical direction, subjected to compression encoding;

decoding the image signal input in said input step;

converting the image signal decoded in said decoding step into an image signal comprising m×n pixel signals in the horizontal direction and the vertical direction by thinning the pixel signals of the decoded image signal; and selectively outputting one of the image signal processed in said conversion step and the image signal processed in said decoding step.

13. An image signal processing apparatus, comprising:

input means for inputting an image signal comprising h×v pixel signals in a horizontal direction and in a vertical direction;

first conversion means for converting the image signal input by said input means into an image signal comprising m×n pixel signals in the horizontal direction and the vertical direction by thinning the pixels signals of the input image signal;

second conversion means for converting the image signal comprising the m×n pixel signals obtained by said first conversion means into the image signal comprising the h×v pixel signals;

encoding means for performing compression encoding of the image signal converted by said second conversion means; and selection means for selectively supplying said encoding means with one of the image signal output from said second conversion means and the image signal supplied to said first conversion means.

14. An apparatus according to claim 13, wherein the value of h equals 720, and the value of v equals 480.

15. An apparatus according to claim 14, wherein the value of m equals 640, and the value of n equals 480.

16. An apparatus according to claim 14, wherein said first conversion means performs processing of thinning one pixel signal per nine pixel signals arranged in the horizontal direction.

17. An apparatus according to claim 16, wherein said second conversion means performs processing of interpolating one pixel signal per eight pixel signals arranged in the horizontal direction.

18. An image signal processing method, comprising the steps of:

inputting an image signal comprising h×v pixel signals in a horizontal direction and in a vertical direction;

converting the image signal input in said input step into an image signal comprising m×n pixel signals in the horizontal direction and the vertical direction by thinning the pixel signals of the input image signal;

converting the image signal comprising the m×n pixel signals obtained in said m×n pixel signals conversion step into the image signal comprising the h×v pixel signals; and performing compression encoding of the image signal converted in said h×v pixel signals conversion step, wherein said encoding step selectively performs compression encoding of the image signal processed in said h×v pixel signals conversion step and the image signal supplied to said m×n pixel signals conversion step.

19. An apparatus according to claim 1, wherein said input means includes image sensing means for converting a subject image into the image signal.

20. An electronic camera comprising the image processing apparatus according to claim 1.

21. An electronic camera comprising the image processing apparatus according to claim 8.

22. An apparatus according to claim 13, wherein said input means includes image sensing means for converting a subject image into the image signal.

23. An electronic camera comprising the image processing apparatus according to claim 13.

* * * * *

UNITED STATES PATENT AND TRADEMARK OFFICE
CERTIFICATE OF CORRECTION

PATENT NO.   : 5,963,678
DATED        : October 5, 1999
INVENTOR(S)  : SHINGO NOZAWA It is certified that error appears in the above-identified patent and that said Letters Patent is hereby corrected as shown below:

ON THE TITLE PAGE [54]:

PUBLICATIONS, "Ratael C. Gouzalez" should read
        --Rafael C. Gonzales--.

ON THE TITLE PAGE [57]:

ABSTRACT, line 8, "compresed" should read
        --compressed--.

FIG. 1:

Sheet 1, "720 x 480" should read --720 x 480--.
        PIXELS                 PIXEL
        SIGNALS               SIGNALS

FIG. 4:

"REPRODUCTING" should read --REPRODUCING--.

COLUMN 3:

Line 43, "signal" should read --signals--.

COLUMN 4:

Line 61, "configratiorn" should read --configuration--.

UNITED STATES PATENT AND TRADEMARK OFFICE
CERTIFICATE OF CORRECTION

PATENT NO. : 5,963,678

DATED : October 5, 1999

INVENTOR(S) : SHINGO NOZAWA

It is certified that error appears in the above-identified patent and that said Letters Patent is hereby corrected as shown below:

<u>COLUMN 5</u>:

Line 65, "to" should be deleted.

Signed and Sealed this

Third Day of April, 2001

Attest:

NICHOLAS P. GODICI

Attesting Officer

Acting Director of the United States Patent and Trademark Office